United States Patent [19]

Neufeld

[11] Patent Number: 5,006,975
[45] Date of Patent: Apr. 9, 1991

[54] POWER FACTOR CORRECTION CIRCUIT
[75] Inventor: Herman Neufeld, Cranston, R.I.
[73] Assignee: Cherry Semiconductor Corporation, East Greenwich, R.I.
[21] Appl. No.: 431,598
[22] Filed: Nov. 3, 1989
[51] Int. Cl.⁵ .......................................... H02M 7/217
[52] U.S. Cl. ...................................... 363/80; 323/222; 363/81; 363/89
[58] Field of Search ...................... 363/79, 80, 81, 82, 363/89; 323/222, 285

[56] References Cited

U.S. PATENT DOCUMENTS

| | | | |
|---|---|---|---|
| 4,404,472 | 9/1983 | Steigerwald | 363/80 |
| 4,437,146 | 3/1984 | Carpenter | 363/79 |
| 4,472,672 | 9/1984 | Patcholok | 363/89 |
| 4,529,927 | 7/1985 | O'Sullivan et al. | 323/222 |
| 4,683,529 | 7/1987 | Bucher | 363/89 |
| 4,816,982 | 3/1989 | Severinsky | 363/89 |
| 4,819,122 | 4/1989 | Gontowski, Jr. | 361/93 |
| 4,825,351 | 4/1989 | Vesugi | 323/222 |

OTHER PUBLICATIONS

Redl et al, "Switching Mode Power Converters: . . . ," POWERCON 7, pp. 1–16, Mar. 25–27, 1980.
Szepesi, "Stabilizing the Frequency of Hysteretic Current-Mode DC/DC Converters," IEEE Trans. on Pwr. Elect., vol. PE-2, No. 4, pp. 302–313, Oct. 1987.
Neufeld, Herman, "Control IC for Near Unity Power Factor in SMPS", published in the Power Conversion and Intelligent Motion Control Conference (PCIM), dated Oct. 16, 1989.

*Primary Examiner*—William H. Beha, Jr.
*Attorney, Agent, or Firm*—Robert M. Asher

[57] ABSTRACT

A power factor correction circuit in which a divided-down version of a rectified input waveform is sampled approximately at its peak by a sample-and-hold circuit. The peak value is then processed to produce a correction signal which is subtracted from the original divided down rectified signal. This produces a reference signal which is then multiplied by the output of an error amplifier to produce a sinusoidal reference signal for the input current. The output of the error amplifier which is used is that which is sampled periodically when the divided-down rectified signal approaches zero volts. The sinusoidal reference is used by peak and valley comparators whose other inputs come from a current sense amplifier. The outputs of the comparators are used to switch a shunting transistor which controls the input current to achieve near unity power factor.

22 Claims, 3 Drawing Sheets

POWER FACTOR CORRECTION CIRCUIT

BACKGROUND OF THE INVENTION

The present invention relates to power factor correction circuits, particularly for use with AC-to-DC converters.

Most off-line switched mode power supplies (SMPS) use a two stage approach in converting an AC input voltage into a DC output voltage. The first stage generally converts the unregulated AC input voltage into an unregulated and partially filtered DC voltage, the second stage then generates the regulated DC voltage.

The first stage is an AC-to-DC converter generally consisting of a full-wave, or a full-wave bridge, rectifier followed by a bulk capacitance to store and deliver energy to the second stage. Because the rectified line voltage is sinusoidal, its value is below that of the capacitor voltage over most of the AC line cycle period. Thus, when the capacitor delivers power to the second stage it must recover that energy in the relatively short time the AC input voltage exceeds the capacitor voltage. As a result, huge impulses of a current are drawn from the line. This not only reduces the power factor but also increases the stress on the rectifiers and capacitor and pollutes the line with harmonics. It is desirable to operate a switched mode power supply source to maximize the use of available power from the AC voltage mains as well as eliminate the harmonic content conducted, in other words, to operate the power supply at unity power factor. This can be achieved by forcing the input current to be sinusoidal.

The prior art does contain circuits which have attempted to provide near unity power factor in switched mode power supplies. For example, U.S. Pat. No. 4,437,146 (Carpenter) discloses a power factor correction circuit in which a shunting switch is provided for the purpose of causing the input current to follow a sinusoidal waveform in phase with the input voltage. A current sense amplifier is used to sense the input current. An error amplifier is provided to generate a feedback voltage signal responsive to the deviation of the voltage at the output of the power supply from a predetermined reference. The outputs of the current sense amplifier and the error amplifier are used in controlling the switching of the shunting switch. A drawback of the disclosed circuit in the Carpenter patent is that it does not disclose a means for quickly responding to variations in load.

It is an object of the present invention to provide a power factor correction circuit with fast response to load as well as input voltage variations, by means of a relatively high bandwidth feedback loop and by feedforward of the input voltage respectively.

SUMMARY OF THE INVENTION

The present invention is directed to a power factor correction circuit for use in a power supply. Power factor correction, as is here referred to, is applicable to any type of equipment which must be operated from a DC voltage derived from an AC voltage source or equipment where means are provided for converting the AC input voltage into a DC voltage in such a way where the power factor is relatively low.

In accordance with one feature of the invention, the power factor correction circuit takes a divided-down rectified signal and periodically samples it and holds it in a capacitor. A circuit is provided for monitoring the divided-down rectified signal to determine when it is at its peak. At the peaks of the signal, a switch is closed to permit the sample-and-hold capacitor to sample the divided-down rectified signal. The signal held by the capacitor is then processed and used as a correction to the divided down rectified signal. The corrected rectified signal is then combined with an output voltage error signal from an error amplifier for use in the conventional manner for providing near unity power factor.

In accordance with a second feature of the invention, the output voltage error signal is sampled when the divided-down rectified signal approaches zero volts. The sampled error signal is held on a capacitor. The signal on the capacitor is combined with a signal corresponding to the divided-down rectified signal for use by peak and valley inductor current comparators.

The sampled peak of the divided down rectified signal gives a rapid response to any perturbation in the input voltage signal. The output voltage error signal is sampled when the output voltage is at its average DC value, thereby providing fast correction to any change in output voltage. The sample-and-hold circuits as used herein provide for rapid modification of the control of the input current to thereby maintain a unity power factor despite perturbations on the input AC line.

Other objects and advantages of the invention will become apparent during the following description of the presently preferred embodiment of the invention taken in conjunction with the drawings.

DETAIL DESCRIPTION OF THE PREFERRED EMBODIMENT

Figure 1A:
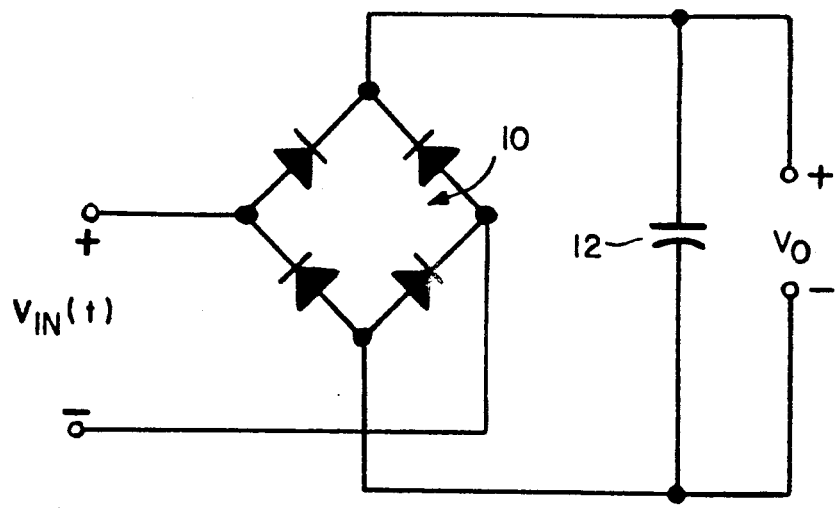
FIG. 1A is a schematic diagram of an AC to DC converter of the prior art without power factor correction.
Figure 1B:
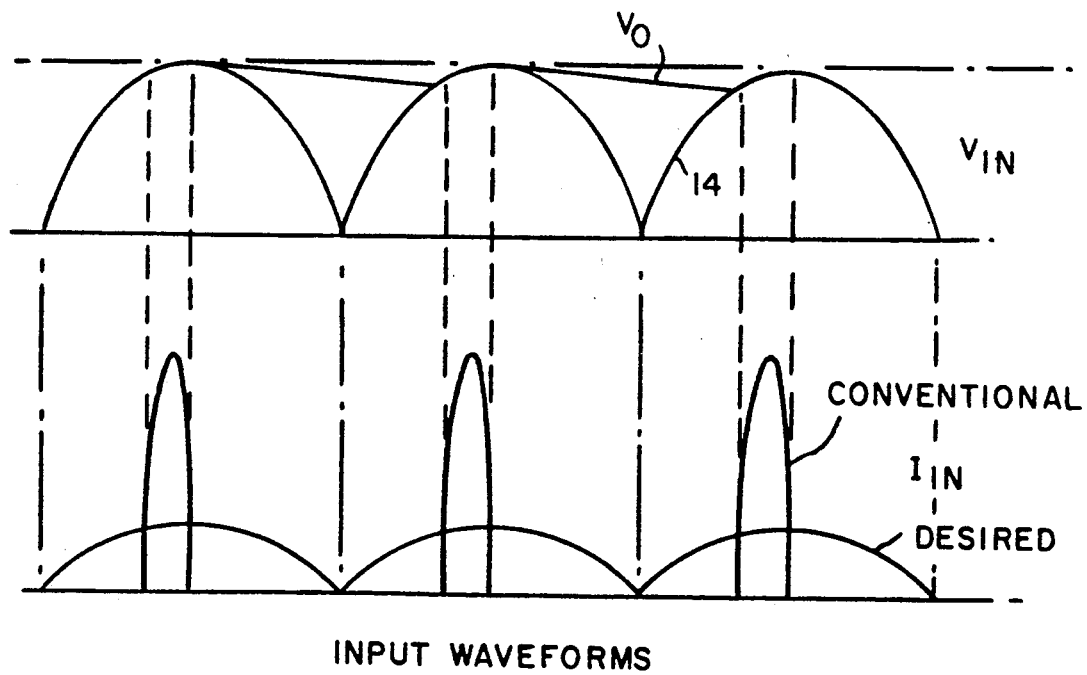
FIG. 1B presents a graph of input voltage and current for the circuit of FIG. 1A and presents the desired waveforms.

Referring now to FIG. 1A, a simple AC-to-DC converter is illustrated. An AC input voltage is provided from an AC power line to a full-wave bridge rectifier 10. The bridge rectifier 10 consists of 4 diodes in a bridge arrangement. An output capacitor 12 is connected across the bridge to deliver an essentially DC voltage. As shown in FIG. 1B, the actual output voltage Vo has a ripple, since the capacitor 12 discharges slightly between each peak of the rectified signal 14.

In accordance with the arrangement of the basic converter in FIG. 1A, the converter only loads the line near its peak voltage level. This, in conjunction with the source impedance of the line, produces an undesirable distortion of the voltage waveform. And because in many instances the expression used in determining the minimum voltage on the DC bus assumes zero source impedance, the supply may even fail to meet regulation at its specified low line input voltage. Unfortunately, the distorted voltage waveform will also be impressed on any other piece of equipment connected to the same line.

The conventional input current waveform shown at the bottom of FIG. 1B introduces harmonics into the line which would also disturb nearby equipment. Because the value of the current is close to zero for a substantial part of the line cycle, the input current essentially consists of a large pulse of current each half cycle as the cycle nears its peaks. The peak current in the uncorrected conventional converter places a high stress on the bridge rectifier 10, the bulk capacitance 12 and other components located along the input current path. It is desirable to operate a switched mode power supply source so as to maximize the use of available power from the AC mains as well as eliminate the harmonic content conducted. The desired input current waveform would be in phase with the input voltage.

Figure 2:
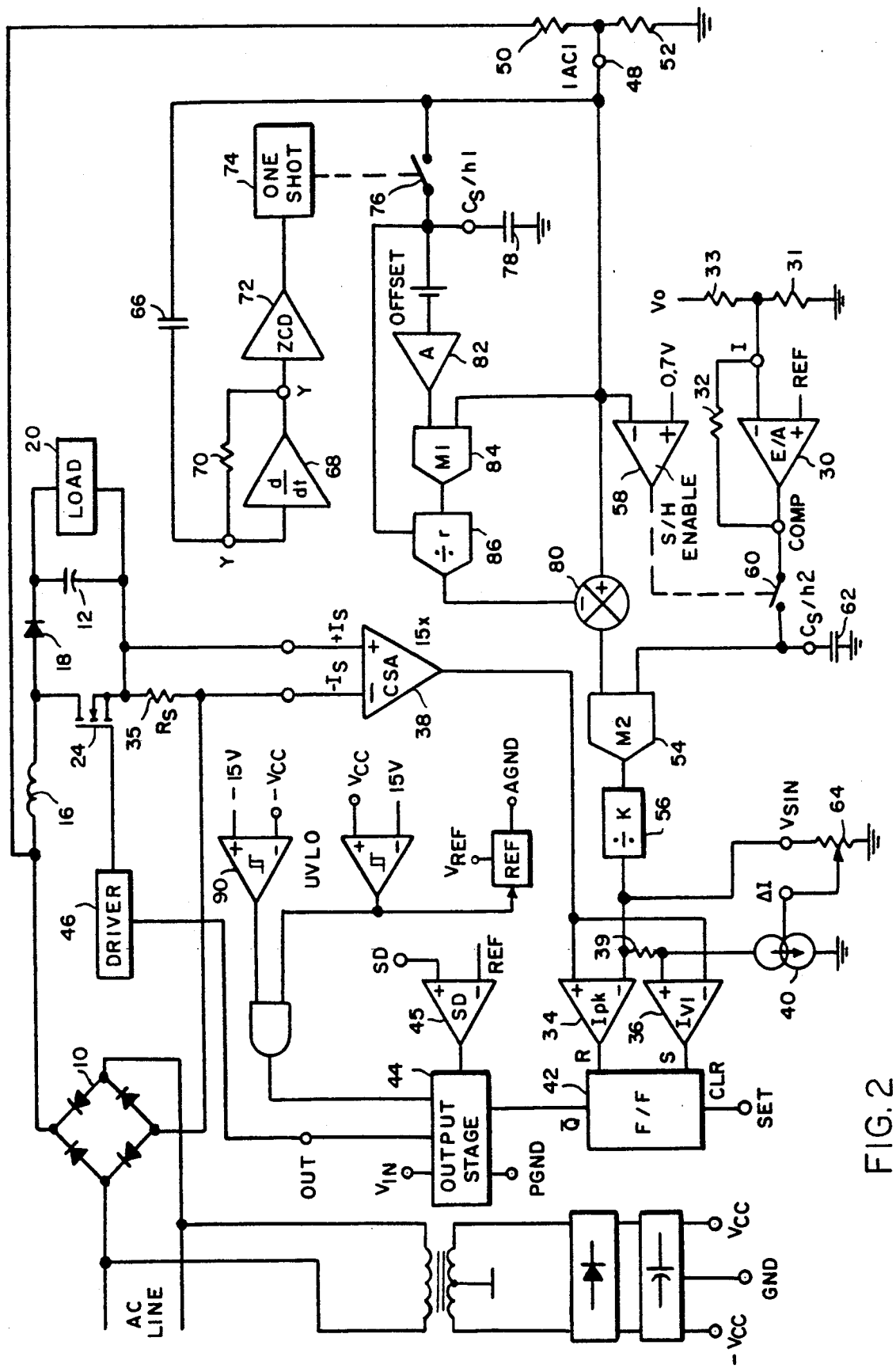
FIG. 2 is a schematic diagram of a AC-to-DC converter with power factor correction of the present invention

Referring now to FIG. 2, the input section of a power supply circuit using power factor correction of the present invention is illustrated. An AC sinusoidal voltage is applied from an AC main to a 4-diode bridge 10 where the waveform is full-wave rectified to produce a rectified input waveform.

The circuit of FIG. 2 is an AC-to-DC converter in that the AC voltage is converted to a DC voltage provided at output capacitor 12. If the rectifier bridge 10 is ignored, the remainder of the circuit, as used herein, is considered a DC-to-DC converter as the rippled waveform provided by rectifier 10 is converted to the DC output voltage. The rectified input waveform is applied to an inductor 16, through which current flows when a shunting transistor 24 is switched on. Under these circumstances, the inductor 16 charges. The shunting transistor 24 is a power MOSFET which acts as a switch. Other examples of switches which may be substituted for shunting transistor 24 include a sense FET, an insulated gate bipolar transistor (IGBT) and a thyristor. When shunting transistor 24 is off, the voltage generated by the discharge of the inductor 16 causes current to flow through a diode 18, thereby charging the output capacitor 12 which clamps the voltage across inductor 16. Capacitor 12 thus provides a relatively constant DC voltage across a load 20. The current from the bridge rectifier 10 passes through a current sensing resistor 35 so that the voltage applied to current sense differential amplifier 38 is proportional to the input current. The shunting transistor 24 is operated so that the input current sensed across resistor 35 is of the same wave shape and in phase with the input voltage applied to the bridge rectifier 10.

Besides controlling input current, the present circuit also regulates the output DC voltage which is done through amplifier 30, also referred to as the error amplifier. For convenience, the output voltage on the output capacitor is scaled down by a voltage divider consisting of resistor 31 and resistor 33. It is this scaled down voltage which is applied to the inverting input of the error amplifier 30. The other input of the error amplifier 30 is supplied with a reference voltage which is generated inside the integrated circuit. A feedback resistor 32 can be connected between the output of the error amplifier and the inverting input of the error amplifier. The output of the error amplifier is thus inversely proportional to the deviation of the output voltage from a reference.

In accordance with the presently preferred embodiment, the peak current of inductor 16 is controlled by the error amplifier 30 and the valley current is controlled by a level shifted voltage follower of the error amplifier output. Both the error amplifier output and the level shifted value form the limits of a window comparator circuit composed of a peak comparator 34 and a valley comparator 36. An offset resistor 39 performs the level shifting function in conjunction with a current source 40. The output of the current sense amplifier 38 is applied to the comparators 34 and 36 so that when the input current reaches the commanded peak and valley levels, the shunting transistor 24 is turned OFF and ON respectively. The peak and valley comparators 34 and 36 control a flip-flop 42 whose output is fed into an output stage 44. The output stage 44 is a group of transistors which convert a weak voltage signal from the comparators into a more powerful signal capable enough to drive a power transistor. The output stage is inside the IC of the presently preferred embodiment. A second stage called the driver 16 is outside the IC. This not only relieves the IC of the drive requirements for switch transistor 24 but provides a drive signal which is confined to the gate to source of transistor 24, thus avoiding resistor 35 from sensing this signal. By appropriately controlling shunting transistor 24, the input current through diode 18 is controlled so as to be roughly proportional to and in phase with the input AC voltage.

A shutdown comparator 45 is provided for detecting an overvoltage condition on the DC bus. This function can also be used to shut down the power factor correction circuit during start-up and short circuit conditions since the circuit has no control in these modes of operation. Because some of the components in the circuit involve signals going to ground and below ground, the circuit operates from both plus and minus supplies. Two undervoltage lockouts 90 and 92 are therefore provided. A NAND gate 94 will enable the output stage 44 only when both supply voltages have achieved their specified level.

The preliminary reference input voltage signal for the input current to follow is provided at terminal 48 by a voltage divider formed by a resistor 50 and resistor 52. The voltage divider formed by resistors 50 and 52 divides down the rectified voltage waveform to provide a divided-down rectified signal at terminal 48. This signal is directly proportional to the rectified input voltage. The presently preferred embodiment divides the rectified signal down to a range of 0 to 9 volts.

It is desirable to provide a sinusoidal reference signal into the peak and valley comparators 34 and 36 in order to correspondingly match the input current to that desirable sinusoid. The sinusoidal reference signal is produced by a multiplier 54. The output of the multiplier 54 is reduced by an attenuator 56 to bring it to an appropriate voltage level for use by the comparators. The presently preferred attenuator 56 divides the amplitude of the multiplier output by 3.

To produce a sinusoidal reference signal out of the multiplier 54, the output voltage error signal of the error amplifier 30 must be DC. But because the output of the error amplifier 30 will vary in response to variations in the DC bus voltage, the desired sinusoidal wave shape of the input current would have to be traded off against system performance, which is related to the gain-bandwidth product of the error amplifier after being compensated by local feedback. To circumvent this tradeoff, in accordance with the present invention, a sample-and-hold (S/H) enable comparator 58 operates a switch 60 in order to sample the error amplifier 30 output periodically at the point when the rectified input voltage signal approaches zero volts. The comparator 58 compares the divided-down rectified signal with a low predetermined reference such as 0.7 volts to provide a signal when the rectified signal is approaching zero volts. The output voltage error signal from the error amplifier is held by a capacitor 62. This is the best possible time to sample since the output ripple voltage of the DC bus is at its average value, that is, at the desired DC output voltage. Sampling is preferable to filtering since a filter would require several cycles to completely respond to a perturbation in the input voltage.

If the signal appearing at capacitor 62 is multiplied simply by the uncorrected divided-down rectified signal, the sinusoidal reference voltage from multiplier 54 would vary in the opposite direction with respect to the input current. (The input current must decrease when the input voltage increases, and vice versa.) The output voltage error signal from error amplifier 30 must vary in proportion to the square of the input voltage. This variation and the associated slow response in output voltage recovery can be eliminated by means of a feed-forward circuit connected between the divided-down rectified signal and a subtractor 80.

In accordance with the present invention, the divided-down rectified signal is manipulated so as to trigger a sample-and-hold when the signal is at its peak. The divided-down rectified signal is passed through a capacitor 66 into a differentiator 68. A resistor 70, together with the capacitor 66, is used to compensate the differentiator 68 for instabilities. The output of the differentiator is an inverted cosine resetting periodically at H intervals. The signal from the differentiator is provided into a slightly sub-zero crossing detector 72. The rectified input waveform is at its peak when the differentiated signal crosses zero. The output of the slightly sub-zero detector 72 activates a one shot 74 which issues a short pulse only at the positive going zero crossing of the differentiated signal to trigger a closing of switch 76. The sample-and-hold capacitor 78 is at one end of the switch 76 while the other end is connected to receive the divided-down rectified signal from the voltage divider formed by resistors 50 and 52. The switch 76 is closed at the beginning of the pulse and opened at the end of the pulse from one-shot 74. In order to sample more exactly at the peak of the divided-down rectified signal, it is preferable to use a slightly sub-zero crossing detector rather than simply a zero-crossing detector. This will permit the switch to close slightly before the peak and open at the peak, so that it is the peak value which is held in sample-and-hold capacitor 78. The benefits of the invention, while not to the same extent, can be obtained using a zero crossing detector since the switch 76 will nevertheless be operated at about the peak of the divided-down rectified signal. The peak value of the divided-down rectified input signals in the sample-and-hold capacitor 78 is labeled r.

The peak value r is processed through a series of components to produce a correction signal which is then subtracted from the divided-down rectified signal by subtractor 80. An offset voltage, which in the preferred embodiment is equal to 3 volts is subtracted from the peak value r held in the capacitor 78. The result is amplified in amplifier 82. The preferred amplification is four-thirds. These modifications to the peak value are used to help condition the basic sinusoidal divided-down rectified signal when multiplied by the multiplier 84. To normalize the multiplied value, attenuator 86 divides the signal by the value r which has been fed forward from the sample-and-hold capacitor 78. The output of the attenuator 86 is a correction signal which gets subtracted from the divided-down rectified signal in the subtractor 80. The result is a reference signal which decreases as the input voltage increases for the intended range of operation, generally in the preferred embodiment, somewhere between 90 and 270 volts AC. Below 90 volts the basic sinusoidal reference voltage applies. The new reference signal produced at subtractor 80 is represented by the following equations:

$$V_{80} = \left(4 - \frac{r}{3}\right)|\sin\omega t| \text{ for } r \geq 3$$
$$= |r \sin\omega t| \text{ for } 0 \leq r \leq 3$$

The reference signal from the subtractor 80 is multiplied in multiplier 54 by the output voltage error signal obtained out of the error amplifier 30. This produces the sinusoidal reference signal which is scaled down by attenuator 56 for use in the comparators.

The sinusoidal reference signal will dictate what the appropriate input current into the system ought to be in order to meet the two conditions of sinusoidal input current and regulated output voltage. The sinusoidal reference signal is applied to the peak comparator 34 after being scaled to the corresponding control range. The resistor 38 and current source 40 are connected from the peak comparator 34 reference to ground in order to develop a second reference for application to the valley comparator 36. These two comparators determine when to turn the output stage off and on when the inductor current sense signal appearing at the other inputs reaches a peak and a valley condition, respectively. The peak reference signal is available at the output of the attenuator 56.

A potentiometer 64 is connected to ground and has a wiper connected to the current source 40. The current source 40 provides a current that is proportional to the difference between the peak and the valley current of the inductor 16. This current varies in proportion to the voltage on the potentiometer wiper. Increasing the voltage on the wiper increases the current flow through the current source 40 causing the voltage drop across resistor 39 to increase and thus increase the difference between the peak and valley references for the current. The voltage at the wiper input from the potentiometer 64 controls the current source 40 so as to establish a variable hysteresis for minimizing variations in the switching frequency and avoid reaching discontinuous-conduction mode of inductor current operation when approaching the zero crossings of the line voltage.

Figure 3:
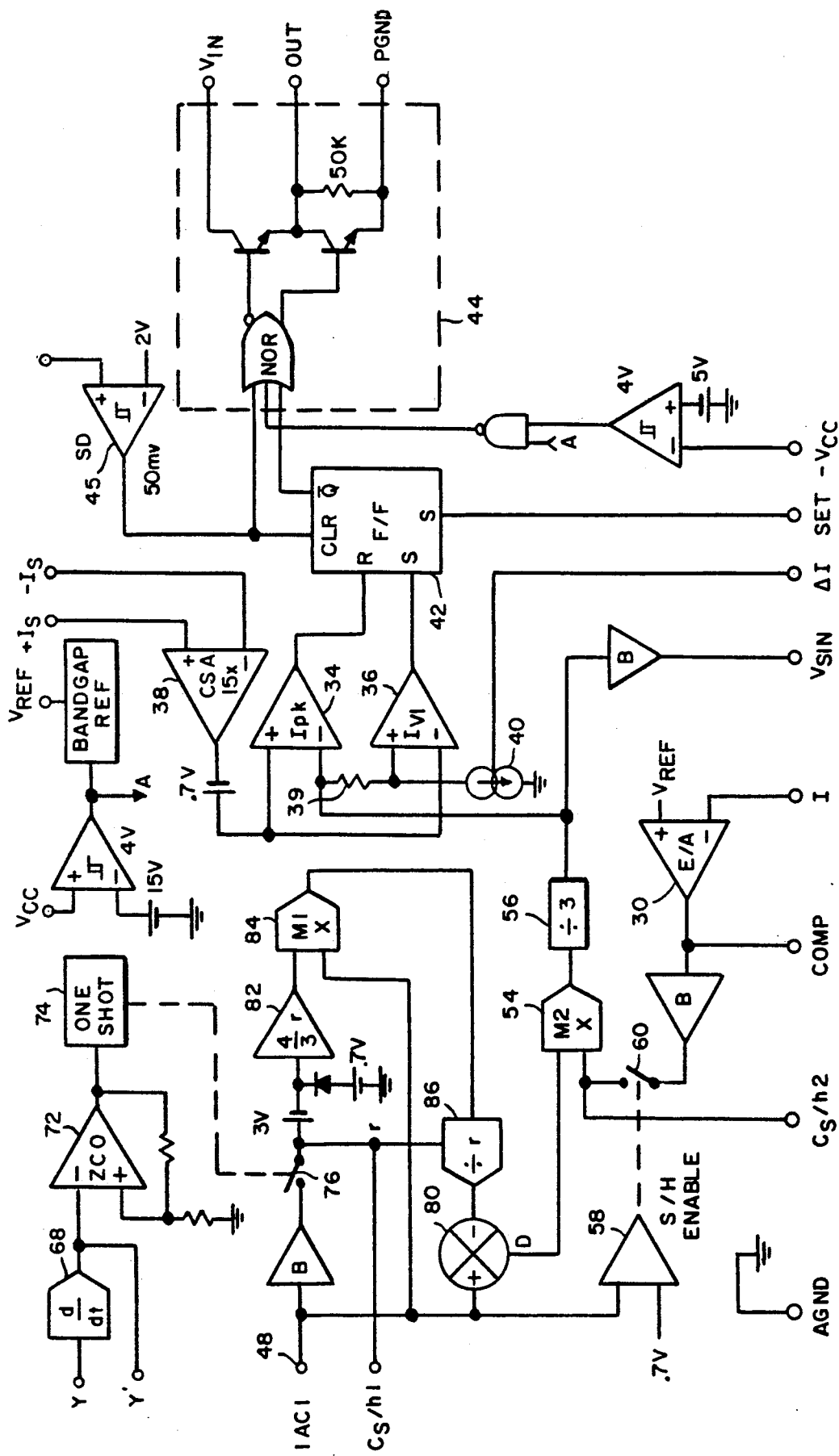
FIG. 3 is a schematic diagram of a power factor correction integrated circuit of the present invention.

The preferred embodiment of the present invention is incorporated on an integrated circuit whose schematic is illustrated in FIG. 3. Components which also appear in FIG. 2 are labeled accordingly with the same numbers. The present invention is also described in the inventor's article "Control IC for Near Unity Power Factor in SMPS" which was published in the Power Conversion and Intelligent Motion Control Conference (PCIM) dated October 16, 1989. The contents of the article are hereby incorporated by reference herein.

By providing sample-and-hold circuitry for capturing the divided-down rectified signal at its peak in each cycle, variations in the line can be advantageously quickly recovered from. The sample-and-hold at the output of the error amplifier further contributes to rapid response to variations in the output current.

The terms and expressions which have been employed here are used in terms of description and not of limitation, and there is no intention, in the use of such terms and expressions, of excluding equivalents of the features shown and described, or portions thereof, it being recognized that various modifications are possible within the scope of the invention claims.

I claim:

1. A power factor correction circuit comprising:
   an input terminal for receiving a divided-down rectified signal;
   a sample-and-hold terminal for connection to a capacitor;
   a switch connected between said sample-and-hold terminal and said input terminal;
   means for periodically closing said switch about when the divided-down rectified signal is approximately at a peak;
   means, connected to said sample-and-hold terminal, for producing a correction signal;
   means for combining said correction signal with said divided-down rectified signal to produce a reference signal;
   voltage sensing means for generating an output voltage error signal corresponding to the deviation of the voltage at the output of a DC-to-DC converter from a predetermined reference voltage;
   means for combining the output voltage error signal with the reference signal to generate a sinusoidal reference signal;
   current sensing means for generating a current-indicating signal indicative of the current flowing into the DC-to-DC converter; and
   current control means receiving the sinusoidal reference signal and the current-indicating signal for regulating the flow of current into the DC-to-DC converter.

2. The power factor correction circuit of claim 1 wherein said means for periodically closing said switch comprises a one shot connected to said switch and means for activating said one shot when the divided-down rectified signal is approximately at a peak.

3. The power factor correction circuit of claim 2 wherein said activating means comprises a differentiator and a slightly sub-zero crossing detector.

4. The power factor correction circuit of claim 2 wherein said activating means is set to activate said one shot and consequently close said switch slightly before the divided-down signal reaches a peak so that said switch will open in response to said one shot when the divided-down signal is at a peak.

5. The power factor correction circuit of claim 1 wherein the reference signal is inversely related to the voltage at the sample-and-hold terminal.

6. The power factor correction circuit of claim 5 wherein said means for producing a correction signal comprises an offset voltage, an amplifier, means for multiplying the output of the amplifier with the divided-down rectified signal and an attenuator, each connected in series.

7. The power factor correction circuit of claim 1 comprising means for sampling the output voltage error signal when the divided-down rectified signal approaches zero volts and for holding said sampled signal for use in said means for combining.

8. An AC-to-DC converter comprising:
   a rectifier for receiving an AC waveform and producing a rectified waveform;
   an inductor connected to said rectifier so that current is provided through said inductor;
   a voltage divider connected to said rectifier for receiving the rectified waveform and producing a divided-down rectified signal;
   a sample-and-hold capacitor; a switch having one terminal connected to said sample-and-hold capacitor and a second terminal for receiving the divided-down rectified signal;
   means for periodically closing said switch so that said sample-and-hold capacitor periodically samples and holds the divided-down rectified signal about when it is at a peak;
   means for processing the signal held by said sample-and-hold capacitor to produce a correction signal;
   means for combining said correction signal with said divided-down rectified signal to produce a reference signal;
   an output capacitor coupled to said inductor;
   voltage sensing means for generating an output voltage error signal corresponding to the deviation of the voltage at the output capacitor from a predetermined reference voltage;
   means for combining the output voltage error signal with the reference signal to generate a sinusoidal reference signal;
   current sensing means for generating a current-indicating signal indicative of the current flowing through from said inductor;
   current control means receiving the sinusoidal reference signal and the current-indicating signal for regulating the flow of current through said inductor and into said output capacitor.

9. The AC-to-DC converter of claim 8 wherein said means for periodically closing said switch comprises a one shot connected to said switch and means for activating said one shot about when the divided-down rectified signal is at a peak.

10. The AC-to-DC of claim 9 wherein said activating means comprises a differentiator and slightly sub-zero crossing detector.

11. The AC-to-DC converter of claim 9 wherein said activating means is set to activate said one shot and consequently close said switch slightly before the divided-down signal reaches a peak so that said switch will open in response to said one shot when the divided-down signal is at a peak.

12. The AC-to-DC converter of claim 8 wherein the reference signal is inversely related to the voltage on said sample-and-hold capacitor.

13. The AC-to-DC converter of claim 12 wherein said means for processing comprises an offset voltage, an amplifier, means for multiplying the output of the amplifier with the divided-down rectified signal and an attenuator, each connected in series.

14. The AC-to-DC converter of claim 8 comprising means for sampling the output voltage error signal when the divided-down rectified signal approaches zero volts and for holding said sampled signal for use in said means for combining.

15. A power factor correction circuit comprising:
   an input terminal for receiving a divided-down rectified signal;
   voltage sensing means for generating an output voltage error signal corresponding to the deviation of the voltage at the output of a DC-to-DC converter from a predetermined reference voltage;

a switch having one side connected to receive the output voltage error signal and an other side;

means for periodically closing said switch when the divided-down rectified signal approaches zero volts;

a sample-and-hold terminal connected to the other side of a multiplier coupled to said input terminal and to said sample-and-hold terminal so as to generate a sinusoidal reference signal;

attenuation means for reducing the amplitude of the sinusoidal reference signal;

current sensing means for generating a current-indicating signal indicative of the current flowing into the DC-to-DC converter; and current control means connected to said attenuation means for regulating the flow of current into the DC-to-DC converter in response to the attenuated sinusoidal reference signal and the current-indicating signal.

16. The power factor correction circuit of claim 15 wherein said means for periodically closing comprises a comparator connected to receive the divided-down rectified signal.

17. The power factor correction circuit of claim 15 further comprising a subtractor connected between said input terminal and said multiplier and a feed forward circuit connected between said input terminal and said subtractor so as to provide said multiplier with a reference signal that is inversely related to the divided-down rectified signal.

18. The power factor correction circuit of claim 17 wherein said feed forward circuit includes means for sampling the divided-down rectified signal at about when it is at a peak.

19. An AC-to-DC converter comprising:

a rectifier for receiving an AC waveform and producing a rectified waveform;

an inductor connected to said rectifier so that current is provided through said inductor;

an output capacitor coupled to said inductor;

a voltage divider for receiving the rectified waveform and producing a divided-down rectified signal;

voltage sensing means for generating an output voltage error signal corresponding to the deviation of the voltage on the output capacitor from a predetermined reference voltage;

a sample-and-hold capacitor;

a switch having one terminal connected to receive the output voltage error signal and an other terminal connected to said sample-and-hold capacitor;

means for periodically closing said switch when the divided-down rectified signal approaches zero volts;

a multiplier coupled to said voltage divider and to said sample-and-hold capacitor so as to generate a sinusoidal reference signal;

current sensing means for generating a current-indicating signal indicative of the current flowing through said inductor; and current control means receiving the sinusoidal reference signal and the current indicating signal for regulating the flow of current from said inductor and into said output capacitor.

20. The AC-to-DC converter of claim 19 wherein said means for periodically closing comprises a comparator connected to receive the divided-down rectified signal.

21. The AC-to-DC converter of claim 19 further comprising a subtractor connected between said voltage divider and said multiplier and a feed forward circuit connected between said divider and said subtractor so as to provide said multiplier with a reference signal that is inversely related to the divided-down rectified signal.

22. The AC-to-DC converter of claim 21 wherein said feed forward circuit includes means for sampling the divided-down rectified signal at about when it is at a peak.

* * * * *